(12) United States Patent
Dotsey et al.

(10) Patent No.: US 7,735,843 B2
(45) Date of Patent: Jun. 15, 2010

(54) STROLLER BRAKE SYSTEM

(75) Inventors: Michael A. Dotsey, Pottstown, PA (US); Patrick Nolan, Royersford, PA (US); Michiel Sebastiaan Emanuél Petrus Knoppert, Chicago, IL (US); Karen Rosenkranz, London (GB); Merijn Hartog, Amsterdam (NL); Marcel Arthur Jan Schreuder, Amsterdam (NL)

(73) Assignee: Graco Children's Products Inc., Atlanta, GA (US)

( * ) Notice: Subject to any disclaimer, the term of this patent is extended or adjusted under 35 U.S.C. 154(b) by 0 days.

(21) Appl. No.: 11/696,150

(22) Filed: Apr. 3, 2007

(65) Prior Publication Data

US 2008/0029982 A1    Feb. 7, 2008

Related U.S. Application Data

(60) Provisional application No. 60/789,240, filed on Apr. 3, 2006.

(51) Int. Cl.
*B62B 9/08* (2006.01)
(52) U.S. Cl. ...................... 280/47.38; 188/20
(58) Field of Classification Search .............. 280/47.38, 280/642, 647, 650, 657, 658; 188/20; 16/35 R
See application file for complete search history.

(56) References Cited

U.S. PATENT DOCUMENTS

| 4,116,464 | A | | 9/1978 | Haley |
| 4,618,033 | A | * | 10/1986 | Kassai .......................... 188/20 |
| 5,125,676 | A | * | 6/1992 | Teng ........................ 280/47.36 |
| 5,215,320 | A | * | 6/1993 | Chen ........................ 280/47.36 |
| 5,351,364 | A | * | 10/1994 | Zun ............................ 16/35 R |
| 5,370,408 | A | * | 12/1994 | Eagan ................... 280/33.994 |
| 5,460,399 | A | * | 10/1995 | Baechler et al. ............. 280/650 |
| 5,709,400 | A | | 1/1998 | Bonnier et al. |
| 5,927,441 | A | * | 7/1999 | Luo ............................. 188/19 |
| 6,099,022 | A | | 8/2000 | Pring |
| 6,170,615 | B1 | * | 1/2001 | Cheng ......................... 188/20 |
| 6,193,263 | B1 | | 2/2001 | Lin |
| 6,203,054 | B1 | | 3/2001 | Matsumoto |
| 6,209,892 | B1 | | 4/2001 | Schaaf et al. |
| 6,398,233 | B1 | | 6/2002 | Liang et al. |

(Continued)

FOREIGN PATENT DOCUMENTS

BE    436 168    8/1939

(Continued)

OTHER PUBLICATIONS

International Search Report and Written Opinion issued in related International application No. PCT/07/65895 mailed Sep. 6, 2007.

(Continued)

*Primary Examiner*—Frank B Vanaman
(74) *Attorney, Agent, or Firm*—Lempia Braidwood LLC (57) ABSTRACT

A stroller is provided having a stroller frame supported by at least one wheel and a handle. The handle includes a brake operator that is coupled to a brake assembly at the wheel. The brake operator is movable between a first position whereby the brake assembly is disengaged from the wheel, and a second position whereby the brake assembly engages the wheel to retard the wheel motion.

17 Claims, 11 Drawing Sheets

U.S. PATENT DOCUMENTS

| | | |
|---|---|---|
| 6,446,990 B1 | 9/2002 | Nania et al. |
| 6,561,537 B1 * | 5/2003 | Chen .......................... 280/648 |
| 6,584,641 B1 * | 7/2003 | Milbredt ..................... 16/35 R |
| 6,817,451 B1 * | 11/2004 | Chen .......................... 188/20 |
| 7,213,818 B2 * | 5/2007 | Chang ..................... 280/47.38 |
| 7,396,038 B2 | 7/2008 | Zweideck |
| 2005/0140105 A1 | 6/2005 | Hernandez |
| 2005/0167952 A1 * | 8/2005 | Lin ............................. 280/650 |
| 2006/0001226 A1 | 1/2006 | Refsum |
| 2006/0043688 A1 | 3/2006 | Chang |
| 2006/0145446 A1 | 7/2006 | Schmider |

FOREIGN PATENT DOCUMENTS

| | | |
|---|---|---|
| CH | 174000 | 12/1934 |
| CN | 2064435 U | 10/1990 |
| DE | 299 07 287 | 7/1999 |
| DE | 102 06 785 | 10/2003 |
| GB | 595 877 | 12/1947 |
| GB | 607 858 | 9/1948 |
| GB | 2 219 054 | 11/1989 |
| GB | 2 403 899 | 1/2005 |

OTHER PUBLICATIONS

Britax Preview Lightweight Umbrella Travel System (Jun. 2004).

* cited by examiner

STROLLER BRAKE SYSTEM

RELATED APPLICATION DATA

This application claims the benefit of provisional application No. 60/789,240 filed Apr. 3, 2006, the disclosure of which is hereby incorporated by reference as if set forth in its entirety herein.

BACKGROUND OF THE INVENTION

1. Field of the Disclosure

The present disclosure is generally directed to strollers, and more particularly to a braking system for a stroller.

2. Description of Related Art

Well-designed strollers should be sturdy and balanced, and should provide the child passenger with safe and comfortable transport. Throughout the development of strollers, an effort has been made to include features that render the stroller versatile and convenient. Efforts have been made to provide these features while achieving a simple design, yet maintaining the stroller rugged and reliable.

A conventional stroller has a plurality of wheels supporting a frame that supports one or more stroller seats. The frame has two spaced front legs, two spaced rear legs, one or more push arms, and a crossbar connected at its laterally outer ends to the push arms. The crossbar can be provided with a pair of laterally spaced gripping surfaces that can be engaged by a caregiver when driving the stroller, and a handle assembly disposed between the gripping surfaces.

Some conventional strollers a braking system that enables a caregiver to lock at least one of the wheels to prevent the stroller from rolling along the ground surface. Braking systems include an actuator that can be moved with the foot or hand of the caregiver to, in turn, cause a braking member to interlock with at least one of the wheels to prevent the wheel from rotating. The frictional forces between the locked wheel and the ground prevent the stroller from easily moving along the ground. Unfortunately, hand operated braking systems require the caregiver to remove at least one hand from the stroller handle. Foot operated braking systems require the caregiver to divert his or her attention from the child and surrounding environment. Furthermore, conventional braking systems are cumbersome and inconvenient to operate.

What is therefore needed is a braking system for a stroller that is easy to access and operate relative to conventional stroller braking systems.

SUMMARY

In accordance with one aspect of the present invention, a stroller is provided having a stroller frame supported by at least one rotatable wheel. A handle is coupled to the frame. The handle includes a brake operator that is movable between a first brake position and a second release position. A brake assembly is supported by the frame and operably coupled to the wheel. A motion transfer mechanism operably couples the brake operator and the brake assembly. Movement of the handle to the brake position causes the brake assembly to retard movement of the wheel.

It should be appreciated that the foregoing and other aspects of the invention will appear from the following description. In the description, reference is made to the accompanying drawings which form a part thereof, and in which there is shown by way of illustration, and not limitation, preferred embodiments of the invention. Such embodiments do not necessarily represent the full scope of the invention, and reference must therefore be made to the claims herein for interpreting the full scope of the invention.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

The disclosed stroller improves upon one or more of the above-noted problems and/or disadvantages in the prior art. For instance, the stroller includes a frame supported by at least one wheel for movement along a ground surface. The stroller frame includes a handle that is grasped by the caregiver to push and maneuver the stroller. The frame further carries a brake system that includes a brake operator that can be actuated by the caregiver to lock and unlock brake assembly that is operable to selectively retard or prevent movement of the stroller wheel. The brake system further includes a motion transfer mechanism that operatively couples the brake operator to the brake assembly. Advantageously, the brake operator is carried by the handle, and can be positioned to be accessible the caregiver without removing both hands from the handle and without diverting his or her attention from the child and surrounding environment.

Figure 1:
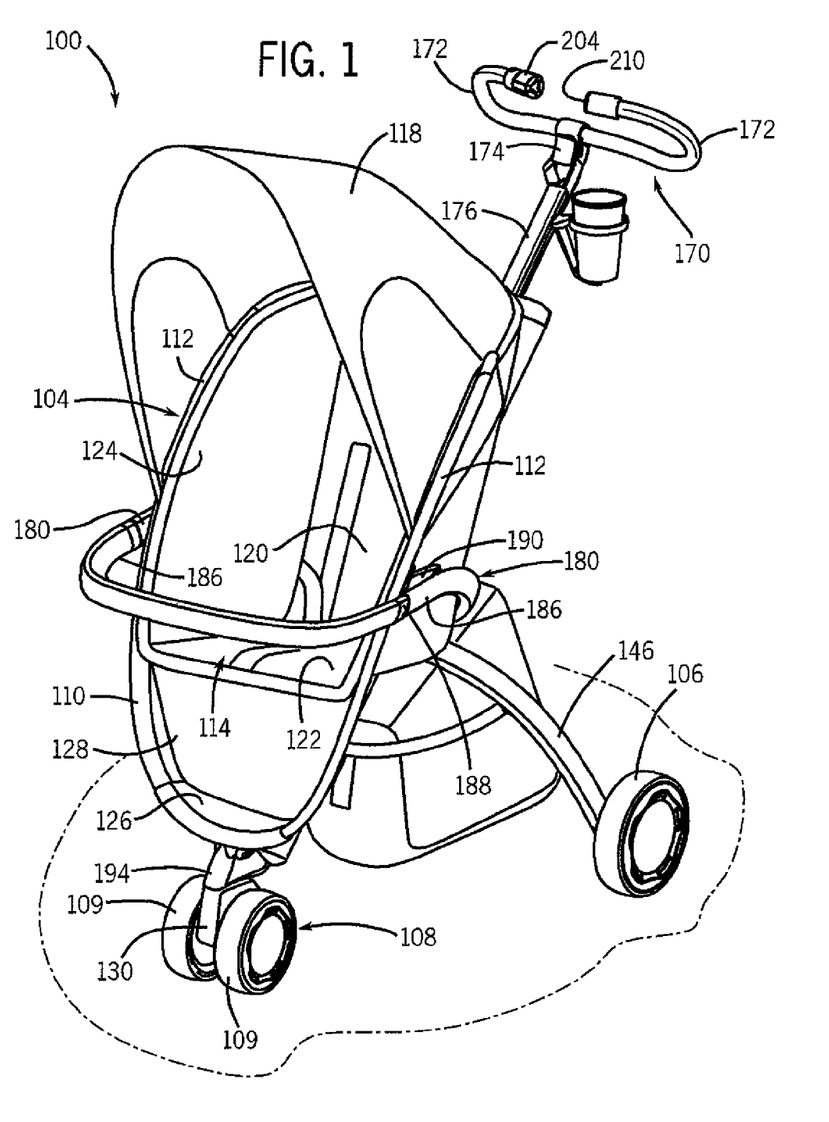
FIG. 1 is a perspective view of an exemplary stroller constructed in accordance with the principles of the present invention.
Figure 2:
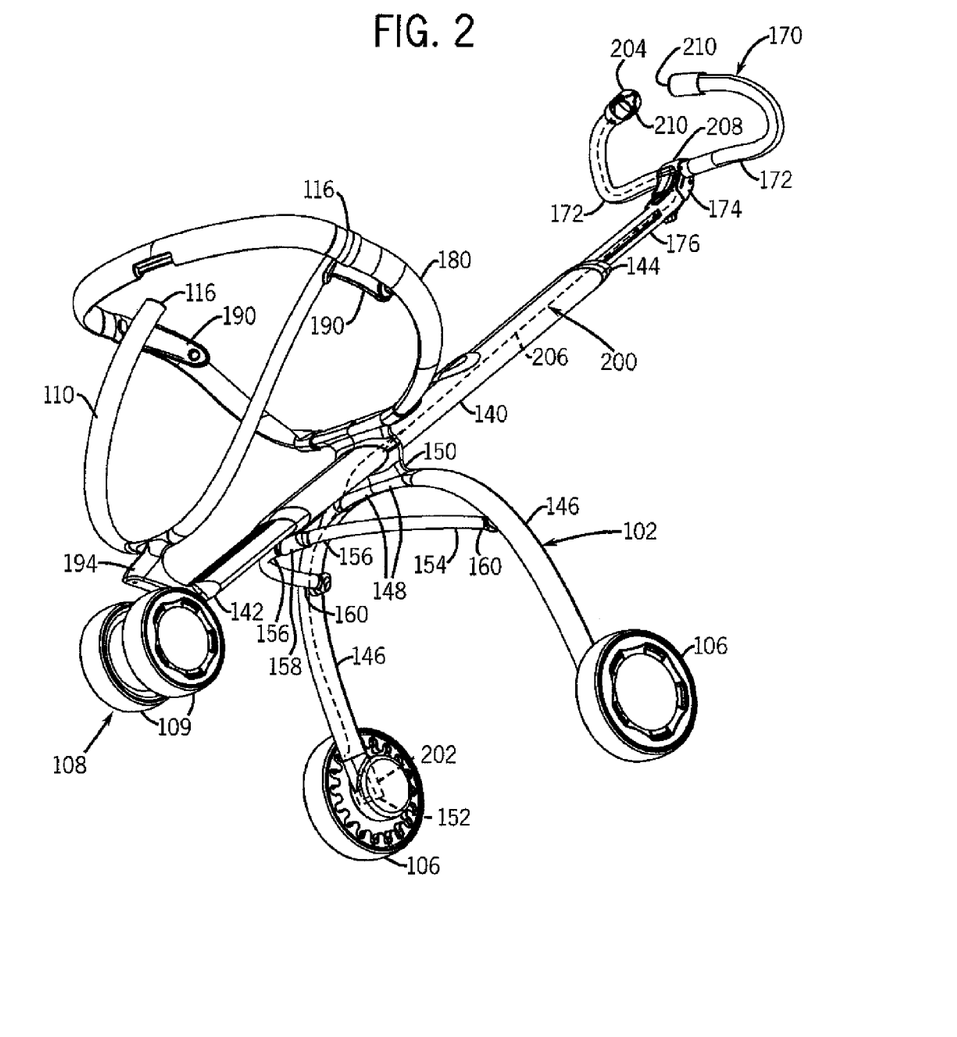
FIG. 2 is a perspective view of the stroller frame with the seat assembly removed to illustrate a brake system having a brake operator, a motion transfer mechanism, and a brake system constructed in accordance with the principles of the present invention.

Turning now to the drawings, a stroller 100 is depicted in FIGS. 1-2, and is constructed in accordance with the teachings of the present invention. In the disclosed example, the stroller 100 generally has a stroller frame 102, a seat assembly 104 supported by the frame 102, and a plurality of wheels supporting the frame 102 on a ground surface. In general, the frame 102 in the disclosed example includes a pair of rear wheels 106 and a single front wheel assembly 108 positioned forward of and at a mid point between the rear wheels. In this example, the front wheel assembly has two wheels 109 spaced apart side by side. The wheels 109 are connected to the spine 140 via a support 130 that is pivotally connected to the lower end 142 of the spine in the usual manner, such that the angular orientation of the front wheel assembly 108 can change to enable easy stroller steering, as appreciated by one having ordinary skill in the art.

The frame 102 in this example generally has a seat mounting frame 110 that is a U-shaped component. In the disclosed example, the seat assembly 104 can be removed from the seat frame 110 and the stroller 100. In general, the removable seat assembly 104 includes a pair of seat attachment tubes 112 positioned on opposite sides of an occupant seat 114. The seat tubes 112 are connected to and can be removed from upper ends 116 of the seat frame 110. The seat 114 of the seat assembly 104 is supported on the stroller at least in part by the seat tubes 112 and has a canopy 118 connected to an upper part of the seat. The seat 114 also has a seat back 120, a seat bottom 122, and seat side wings 124 positioned on opposite sides of the seat back and the seat bottom.

A footrest 126 is positioned at the bottom of the seat assembly 104 and is suspended from the front edge of the seat bottom 122 by a mesh fabric panel 128 in this example. The footrest 126 is also connected to the lower part of the seat frame 110. In the disclosed example, the seat 104 can be made entirely of fabric or like materials and be suspended from the seat tubes 112 and the seat frame 110, when attached. Alternatively, portions of the seat assembly 104 can have a removable cover placed over a generally rigid supporting structure that defines and shapes at least part of the seat, such as the seat bottom 122 and parts of the seat side wings 124. Thus, once attached to the seat frame 110, the seat assembly 104 can be sufficiently supported on the stroller and substantial enough to support the weight of a child occupant. As will be evident to those having ordinary skill in the art, the configuration and construction of the seat assembly 104 and the seat 114 can vary considerably and yet fall within the spirit and scope of the present invention.

The stroller frame 102 in the disclosed example generally has a central spine 140 with a lower end 142 positioned near the front wheel assembly 108. The spine 140 also has an upper end 144 positioned behind the seat back 120 of the seat assembly 114 and between the rear wheels 106. A pair of curved rear legs 146 extends downward in opposite directions from an underside of the spine 140. Each leg 146 is bowed outward and extends in a rearward and downward direction. A proximal or top end 148 of each leg 146 is coupled to a rear leg connector 150 positioned on the underside of the spine 140. The connector 150 is positioned in this example about midpoint between the upper end 144 and the lower end 142 of the spine 140. A distal or lower end 152 of each rear leg 146 in this example carries one of the rear wheels 106.

A rear leg link 154 is positioned on each side of the frame 102 and links each rear leg 146 to the spine 40. Each link 154 has one end 156 coupled to a connector 158 on the underside of the spine 140 positioned below the rear leg connector 150 along the spine. Each link 154 also has another end 160 coupled to a corresponding one of the rear legs 146. The links 154 provide stability for the stroller frame 102, and particularly for the rear legs 146, during use.

The stroller 100 disclosed herein has a pair of curved seat frame support arms 180. The support arms 180 extend upward in opposite directions from the top side of the spine 140. Each support arm 180 is bowed outward and extends in a forward and upward direction relative to the spine 140. A proximal or bottom end 182 of each support arm 180 is coupled to a support arm connector 184 positioned on the top side of the spine 140. The support arm connector 184 in this example is positioned at the same location along the spine as the rear leg connector 150, which is on the underside of the spine. A distal end portion 186 of each support arm 180 is bent downward, extends generally horizontally forward, and terminates at an exposed end or face 188.

In this example, a seat frame link 190 is positioned on each side of the seat frame 110 and extends in a rearward direction. Each seat link 190 is coupled to one of the support arms 180. The connection point between each seat link 190 and the respective support arm 180 in this example is spaced rearward from the exposed end 188 along the distal end portion 186.

Also in the disclosed example, a frame bracket 194 is located at the lower front portion of the frame 102. The frame bracket 194 is connected to the lower most portion 196 of the seat frame 110 and to the lower end 142 of the spine 140. The front wheel assembly 108 is mounted to and extends downward from the frame bracket 194. The frame bracket 194 links the spine 140 to the seat frame 110 and provides the front wheel mounting location in the disclosed example.

The spine 140 is oriented centrally between the rear wheels 106 and defines a central or longitudinal axis of the stroller 100. In the disclosed example as shown in FIGS. 1 and 2, the spine 140 is oriented at an angle with a low point at its lower end 142 and a high point at its upper end 144.

The frame 102 in the disclosed example also has a stroller handle 170 that can be grasped by the caregiver for pushing and maneuvering the stroller 100. The handle 170 includes a gripping surface that can comprise a rubber or other elastomeric material comfortably engaged by a user. The disclosed handle 170 generally has an upward facing, open C-shape that forms two handle sections 172. The two sections 172 extend in opposite directions from a handle bracket 174. The handle bracket 174 is coupled to a stanchion 176 that extends from the upper end 144 of the frame spine 140. In the disclosed example, the stanchion 176 is essentially a linear structure and extends parallel to and is aligned with the spine 140, which is also a generally linear structure.

The spine is oriented to position the handle 170 so that a caregiver can stand behind the stroller and push the stroller in a conventional manner by the handle 170. The seat assembly 104 is positioned above and forward of the spine 140 and faces forward relative to the stroller 100 away from the handle 170. However, the arrangement of the seat and frame components disclosed herein can vary and yet fall within the spirit and scope of the present invention. Additionally, the shape, size, configuration, orientation, and location of the various frame and seat assembly components can also vary from the example shown without departing from the spirit and scope of the present invention.

Advantageously, as illustrated in FIG. 2, the stroller frame 102 supports a brake system 200 that includes a brake assembly 202 associated with at least one of the wheels, for instance one of the rear wheels 106, a brake operator 204 connected to the handle 170, and a motion transfer mechanism 206 operably coupling the brake operator 204 and a brake assembly 202. The brake operator 204 can be actuated by the caregiver to lock and unlock the brake assembly 202 and thus retard or prevent movement of the associated wheel as desired. When the brake assembly 200 is in a locked position, movement of the associated wheel 106 is retarded or prevented. When the brake assembly 202 is in an unlocked position, the wheel 106 is free to move unencumbered by the brake assembly 202. The brake system 200 will now be described in detail.

Specifically, each handle section 172 defines opposing terminal ends 208 and 210, respectively. The brake operator 204 is illustrated as a knob disposed at the free terminal end 210 of one of the handle sections 172, though it should be appreciated that the brake operator 204 could alternatively be disposed at the terminal end 208 of one of the handle sections 172, or anywhere between the terminal ends 208 and 210 of one of the handle sections 172. The operator 204 can be described as being at an "inner" terminal end 210 relative to the position of the caregiver's hand, as when the caretaker grips the handle section 172, the operator 204 is within reach of his or her thumb.

Figure 3:
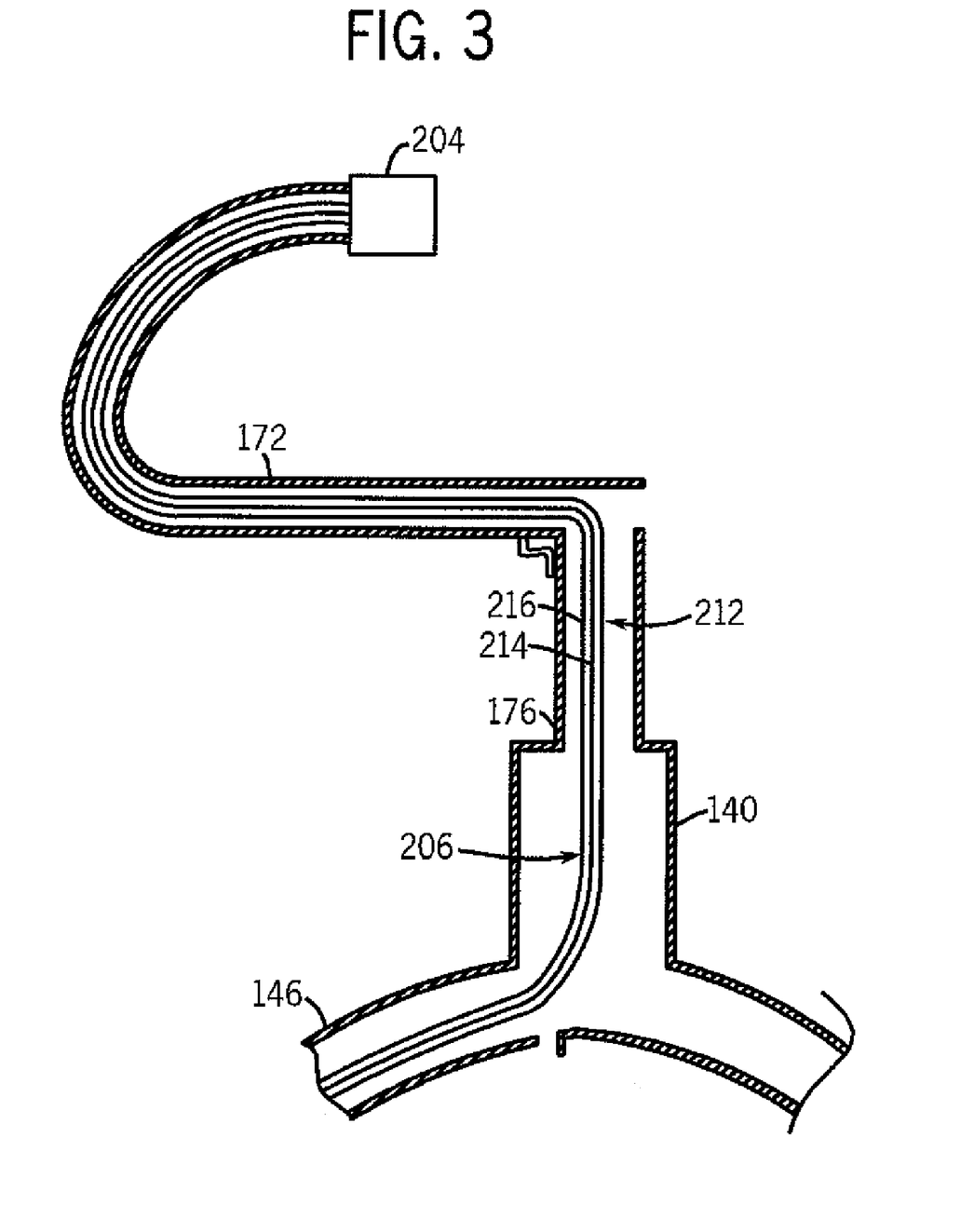
FIG. 3 is a is a schematic front elevation view of a portion of the stroller frame with portions cut away to illustrate the motion transfer mechanism.
Figure 10:
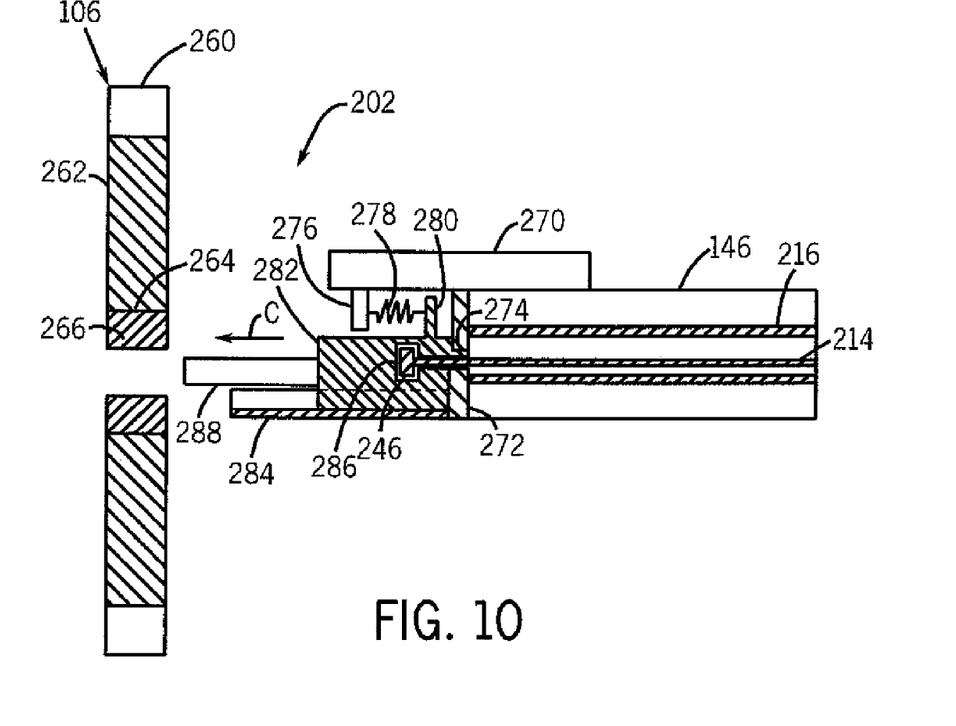
FIG. 10 is a sectional side elevation view of the brake system.

Referring also to FIGS. 3 and 10, the motion transfer mechanism 206 extends between the brake operator 204 and the brake assembly 202. The motion transfer mechanism 206 can include a cable assembly 212 including a cable 214 disposed within a corresponding sheath 216. The cable 214 can be formed from any metal wire material, and the sheath 216 can be formed from any elastomeric material that is sufficiently robust to protect the cable 214 within the stroller frame 102. The cable assembly 212 is connected at its proximal end to the brake operator 204, and extends through the stanchion 176 and into the spine 140.

In the illustrated embodiment, the cable assembly 212 extends from the brake operator 204, through the handle section 172, the stanchion 176, and into the spine 140, one of the rear legs 146, and is connected to the brake assembly 202 associated with one of the rear wheels 106. Specifically, the proximal end of the sheath 216 is anchored at the brake operator 204, and the distal end of the sheath 216 is anchored at the brake assembly 202. The cable 214 is thus free to move within the sheath 216 as the brake operator 204 is actuated. During operation, the user can actuate the brake operator 204 in one direction, which causes the cable 202 to translate and apply an unlocking force to the brake assembly. Alternatively, the brake operator 204 can be actuated in the opposing direction, which locks the brake assembly 202.

Figure 4:
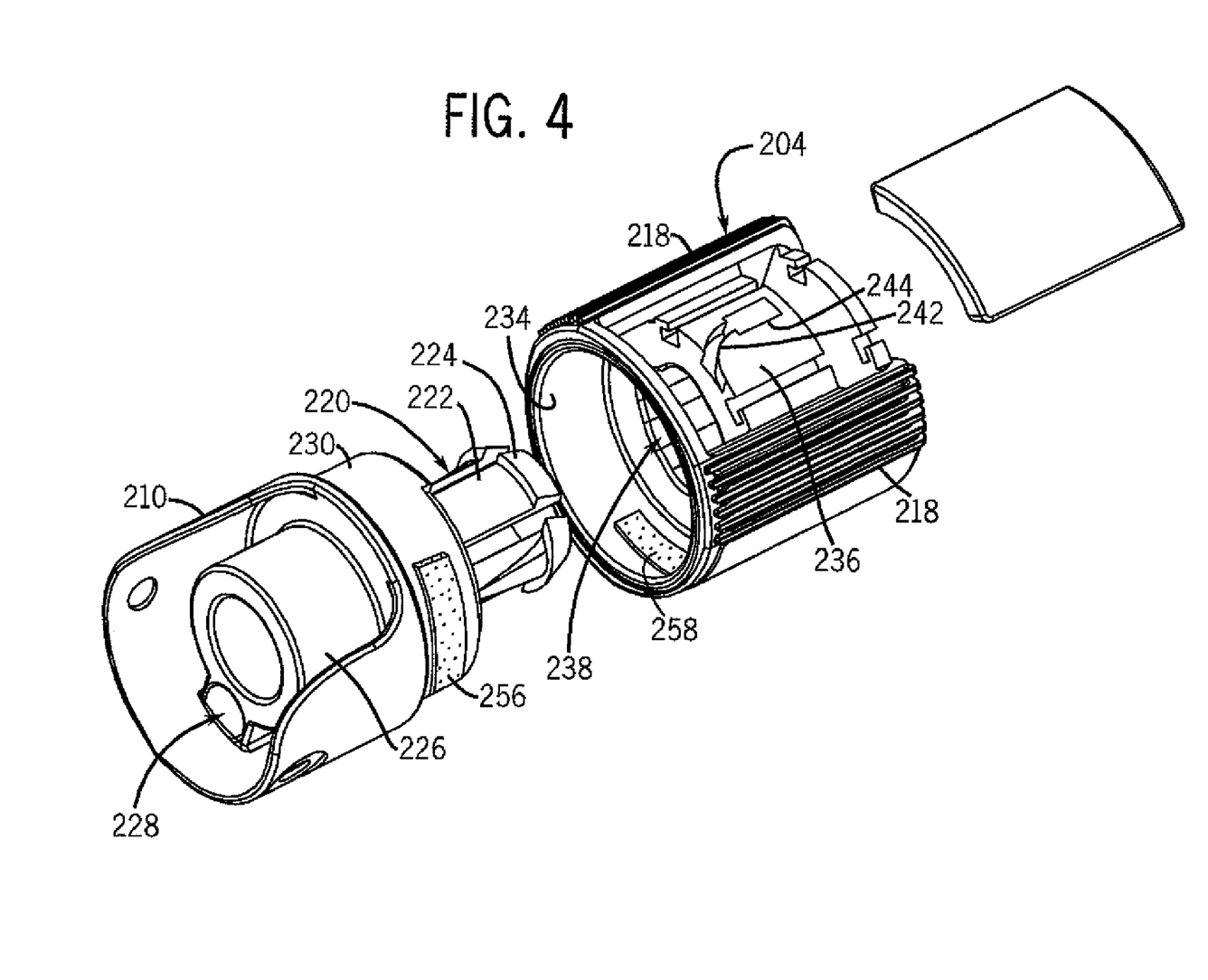
FIG. 4 is an exploded assembly view of the operator and handle of the stroller frame.
Figure 5:
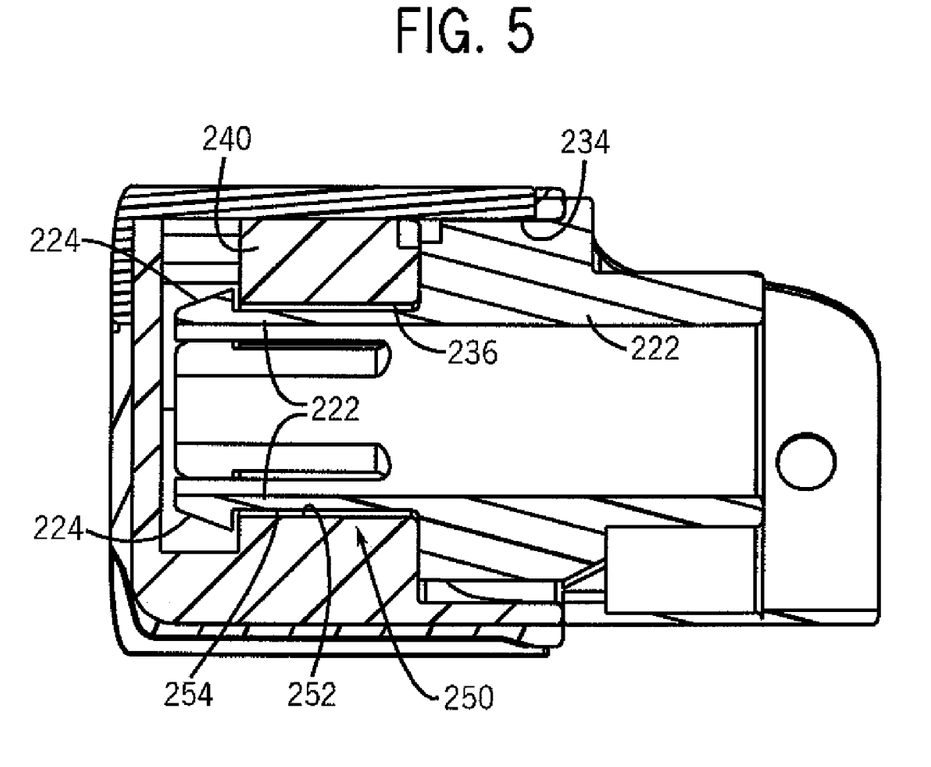
FIG. 5 is a sectional side elevation view of the operator connected to the handle.
Figure 6:
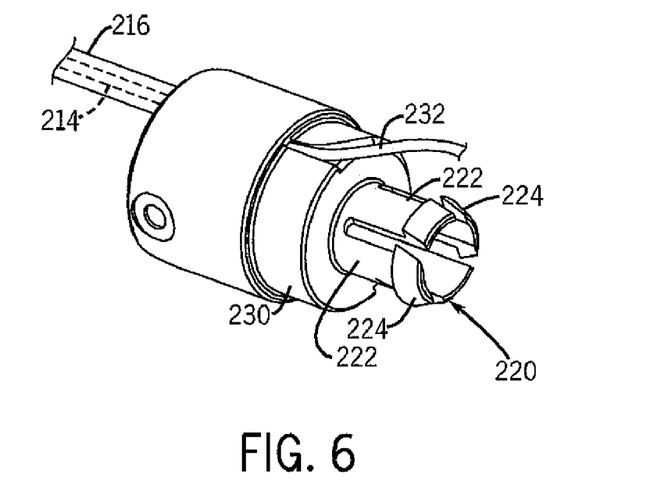
FIG. 6 is a perspective view of the handle coupled to the motion transfer mechanism.
Figure 7:
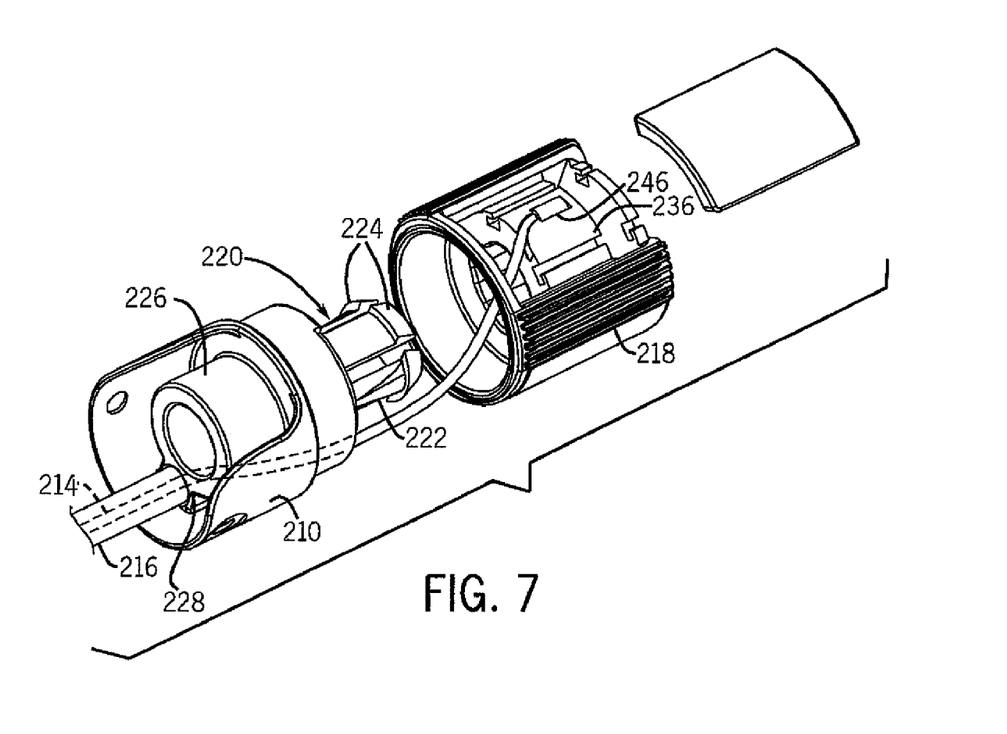
FIG. 7 is a partially assembled view of the operator and handle coupled to the motion transfer mechanism.

It should be appreciated that the motion transfer mechanism 206 illustrated and described with reference to FIG. 4 is only one example of numerous alternative mechanisms, and that all such alternative mechanisms that transfer motion from the brake operator 204 to the brake assembly 202 are contemplated by the present invention.

The brake operator 204 will now be described with reference to FIGS. 4-8. Specifically, the operator 204 is illustrated as being connected to, and extending axially from, the terminal end 210 of the handle section 172 so as to be easily accessible to the thumb of the caregiver operating the stroller 100. The operator 204 can include a grip 218 or a plurality of radially spaced, and axially extending, grip surfaces at its outer surface that presents a texture different from that of the adjacent handle section 172 to provide the caregiver with tactile feedback that he or she is touching or actuating the operator 204.

A finger 220 projects inwardly from the terminal end 210 of the handle section 172, and includes a plurality of radially spaced flexible tabs 222. Each tab 222 has a barb 224 disposed at the distal end of its radially outer surface. The barbs 224 thus each project radially outwardly from the tabs 222. The terminal end 210 further includes an elongated interior, centrally disposed, cylindrical wall 226 and a channel 228 extending adjacent the wall 226. The channel 228 is sized smaller than the sheath 216 but larger than the cable 214. An elongated groove 232 is formed in a necked-down outer surface 230 of the terminal end 210, and terminates at a location inside the operator 204. Channel 228 and groove 232 have a greater dimension than that of the cable 214 and thus provide a channel that allows the cable 214 to extend from within the handle section 172 to the interior of the operator 204.

The operator 204 can be in the form of a knob having an outer collar 234 that receives the necked-down outer surface 230 of the terminal end 210 of handle section 172. The necked-down portion 30 is received by the collar 234 sufficiently loosely such that the inner surface of the collar can slide along the outer surface of the necked-down portion 230. The collar 234 is thus joined to the terminal end 210 in a manner so as to enable relative rotation between the operator 204 and the handle section 172.

The operator 204 includes a neck 236 extending axially between the axial outer ends of the operator. A cylindrical aperture 238 extends horizontally through the neck 236 and a radial notch 240 is formed in the neck at a location adjacent, but spaced from, the distal axial end of the neck 236. The aperture 238 has a diameter greater than the outer diameter of the flexible tabs 222, but smaller than the outer diameter of the barbs 224. As the finger 220 is received in the aperture 238, the tabs 222 flex inwardly so that the barbs 224 are also received therein. The barbs 224 are continuously inserted until the barbs 224 extend beyond the notch 240, at which point the tabs 222 snap out such that the barbs 224 engage the notch 240. The operator 204 is thus rotatable with respect to the handle section 172.

The operator 204 further includes an elongated curved channel 242 extending radially into, but not through, the radially outer surface of neck 236. The channel 242 terminates at a rectangular aperture 244. The proximal end of the sheath 216 of cable assembly 212 is anchored at the mouth of channel 228, and the cable 214 extends through the channel 228 and groove 232. The cable further extends into the channel 242. The proximal end of the cable 214 is connected to a slug 246 that is received in the rectangular aperture 244 such that the cable 214 is anchored to the operator 204 at the aperture 244.

Figure 8:
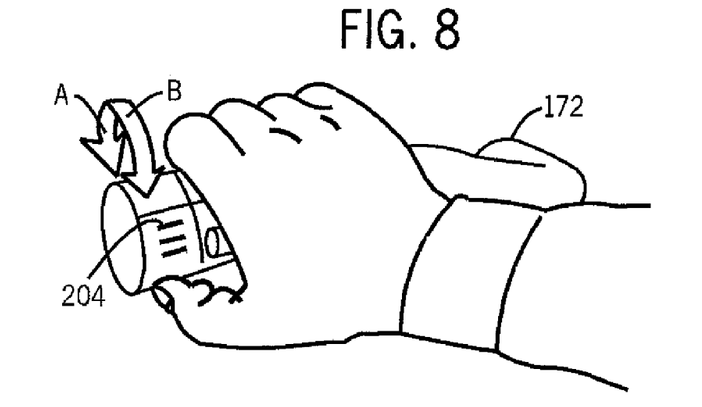
FIG. 8 is a perspective view schematically illustrating the operation of the brake operator.

As best shown in FIG. 8, during operation, as the operator 204 is rotated in a first direction relative to the handle section 172 along the direction of Arrow A, the cable 214 spools about the neck 236, thereby drawing in the distal end of the cable 214. As the operator is rotated in a second direction opposite the first direction (Arrow B), the cable 214 unwinds from the neck 236, thereby allowing the distal end of the cable 214 to push outwardly.

Referring now to FIG. 8, the brake operator 204 can include an anti-rotation mechanism 250 that prevents the operator 204 from unintentionally rotating from the unlocked position to the locked position. As will be appreciated from the description below, the brake assembly 202 includes a spring member that biases the motion transfer mechanism, and thus the operator 204, toward the locked position. Accordingly, the operator includes a detent 252 extending radially inward from the radially inner surface of the neck 236. The detent 252 is axially aligned with a handle detent 254 that extends radially outwardly from the radially outer surface of one of the fingers 222. When the operator 204 is rotated to the unlocked position, the detents 252 and 254 engage and require an increased force to cause the detents to slip over and past each other. The detents 252 and 254 are circumferentially positioned such that they slip past each other when the operator 204 has been rotated to the unlocked position. The interference between the detents 252 and 254 require a predetermined to be applied to the operator 204 that is greater than that the biasing force of the spring member of the associated brake assembly in order to cause the operator 204 to rotate relative to the handle section 172 towards the locked position.

Referring again to FIG. 4, the anti-rotation mechanism 250 can further include a friction member 256 disposed on the radially outer surface of the necked-down section 230 and a corresponding friction member 258 disposed on the radially inner surface of the collar 234. The friction members 256 and 258 can be brought into contact and rub against each other, resisting relative motion. In accordance with one aspect of the present invention, the friction members extend 60° circumferentially about the operator and handle section 172. Accordingly, the caregiver experiences resistance for the first 60° of operator rotation from the unlocked position to the locked position. The full operator stroke can be 90°, such that the final 30° of rotation can be accomplished with little or no resistance. Advantageously, the frictional forces are ergonomically friendly, as the strength in the caregiver's thumb is typically strongest during the first 60° of rotation, and weakest during the final 30° of rotation. The friction members can provide enhanced resistance to rotation in only one direction if desired, such that resistance is only increased when the operator 204 is rotated from the unlocked toward the locked position.

Figure 9:
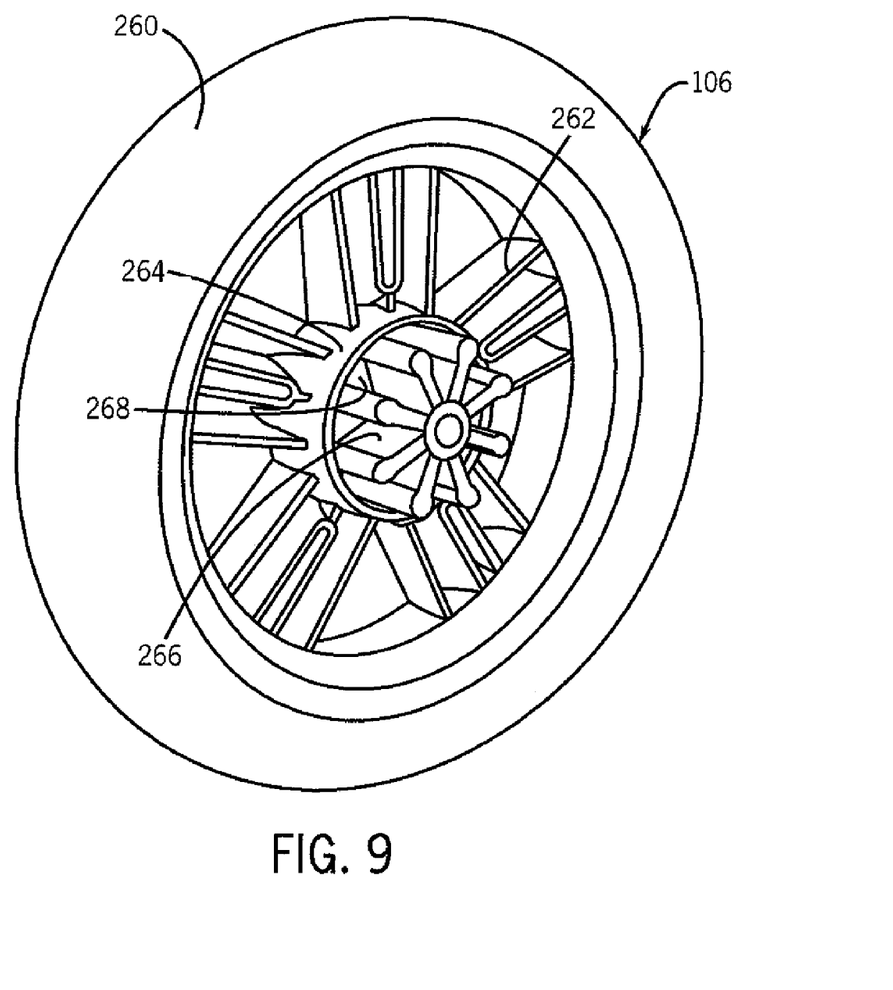
FIG. 9 is a perspective view of a stroller wheel engaged by the brake system.

The brake assembly 202 will now be described with reference to FIGS. 9-10. The brake assembly 202 is illustrated as being operatively associated with one of the wheels, for instance a rear wheel 106, and can be actuated to a locked position whereby rotation of the associated wheel is prevented. The brake assembly 202 thus prevents the stroller 100 from traveling along the ground surface when the brake assembly 202 is locked.

The rear wheel 106 includes an outer ground-engaging surface 260, for instance a tire. A plurality of outer spokes 262 extends radially between a hub 264 and the tire 260. A plurality of inner spokes 266 extends radially within the hub 264. Gaps 268 are disposed between adjacent inner spokes 266.

The distal end of rear leg 146 is closed via a plate 272. An aperture 274 extends axially through the plate 272 that is sized smaller than the sheath 216, but larger than the cable 214. The cable 214 thus extends through the aperture 274 while the sheath 216 is anchored to the plate 272.

The brake assembly 202 includes a bracket 270 supported by the frame 102. A spring seat 276 extends inwardly from the distal end of the bracket 270, and is connected to one end of a biasing member, such as a coil spring 278. The coil spring 278 is connected at its opposite end to a second spring seat 280 disposed upstream from the first spring seat 276. The second spring seat 280 is connected to a cable retainer 282 that is movably supported within a guide 284 extending axially out from the plate 272. The guide 284 can extend along the lower surface of the cable retainer 282, and can further extend partially or fully upwardly adjacent the opposing sides of the cable retainer 282. The cable retainer 282 includes a rectangular groove 286 that receives a slug 246 connected to the distal end of the cable 214. Accordingly, as the cable 214 is extended and retracted, the cable retainer 282 is likewise extended and retracted.

A latch 288 extends axially out from the cable retainer 282, and is radially aligned with the inner spokes 266, and thus also aligned with the gaps 268 disposed between adjacent spokes 266. Accordingly, when the brake assembly 202 is locked, the latch 288 extends along the direction of Arrow C into one of the gaps 268 (shown in phantom in FIG. 10), and the resulting interference between the latch 288 and the spokes 266 prevents rotation of the rear wheel 106 and movement of the stroller 100 along the ground surface. When the brake assembly 202 is in the unlocked configuration, the latch 288 is removed from interference with the wheel 106, and the wheel 106 is therefore free to rotate, thereby facilitating unencumbered movement of the stroller 100 along the ground surface. The spring 278 imparts a force against the second spring seat, and thus the cable retainer 282 and latch 288, that biases the latch 288 towards the locked position.

While the brake assembly 202 has been illustrated and described in accordance with one embodiment, one having ordinary skill in the art will appreciate that the brake assembly 202 could comprise any number of structures and configurations that are capable of causing the directional forces of the motion transfer mechanism 206 to lock and unlock the brake assembly 202 in response to actuation of the brake operator 204 without departing from the spirit and scope of the present invention.

Figure 11:
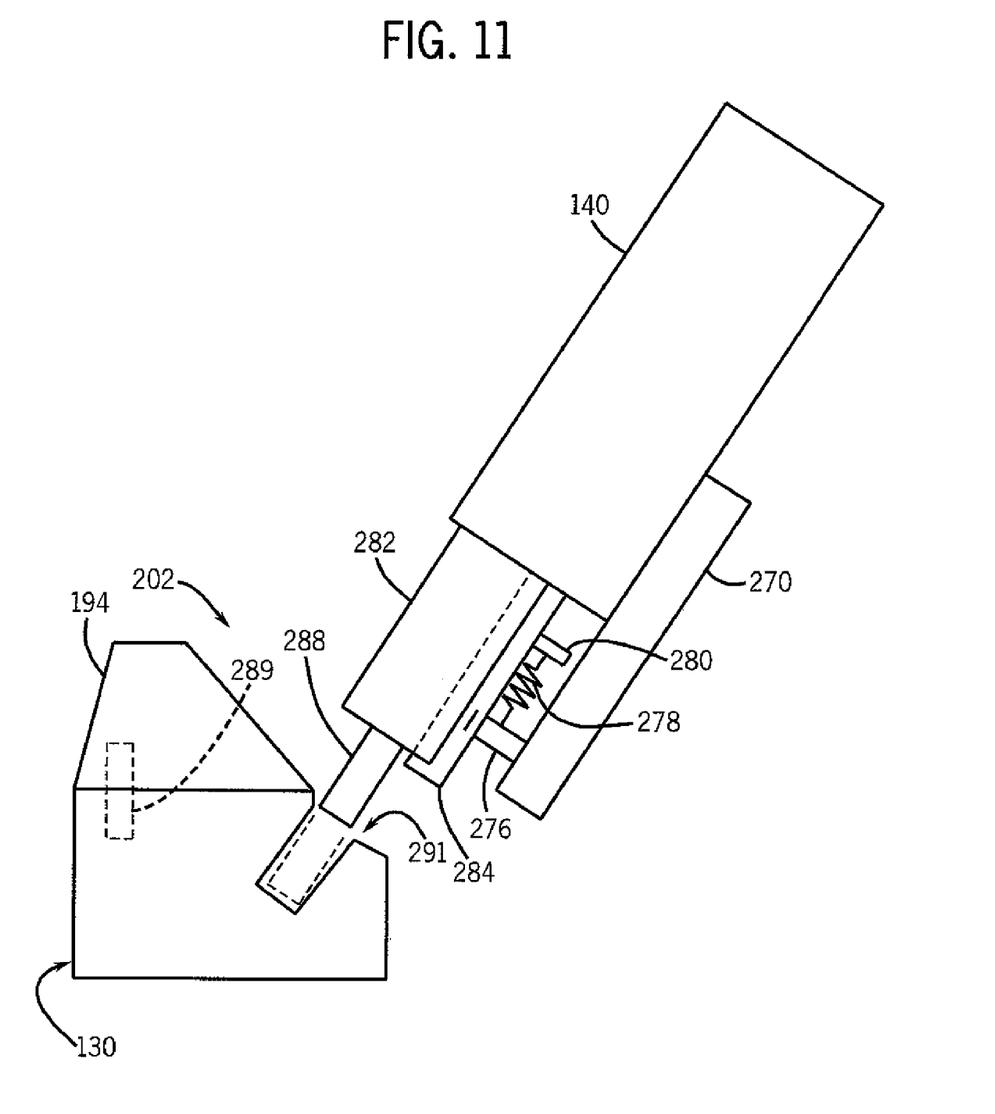
FIG. 11 is a sectional side elevation view of a brake system constructed in accordance with an alternative embodiment.

Referring now to FIG. 11, the brake assembly 202 is illustrated as being associated with the front wheel assembly 108 in accordance with an alternatively embodiment. Specifically, the brake assembly 202 can be actuated to a locked position whereby angular motion of the front wheel assembly 108 is prevented such that the angular orientation of the front wheels 109 cannot change. The brake assembly 202 can thus cause the stroller 100 to travel in a straight, linear direction along the ground surface when the brake assembly 202' is locked.

In particular, the support 130 is pivotally connected to the stroller frame 102 via the frame bracket 194. Specifically, a pivot connector 289 can connect the support 130 and the frame bracket. A recess 291 is formed in an upper surface of the support 130 at a location spaced from the bracket 194. The recess 291 extends in a direction having a vertical component (angled with respect to the vertical, as illustrated). The brake assembly 202 is mounted onto the undersurface of the lower end 142 of the spine 140, and operates in the mannner described above. Accordingly, when the brake assembly 202 is locked, the latch 288 extends into the recess 291 and prevents the support from pivoting about the bracket 194. When the brake assembly 202 is unlocked, the latch 288 is free from the recess 291 and the support 130 and associated front wheels 109 are free to pivot about the spine 140 to change the angular orientation of the wheels 109 and correspondingly steer the stroller. It should be appreciated that an axially extending slot can be formed in the guide 284 that slidably receives the spring seat 280.

Figure 12A:
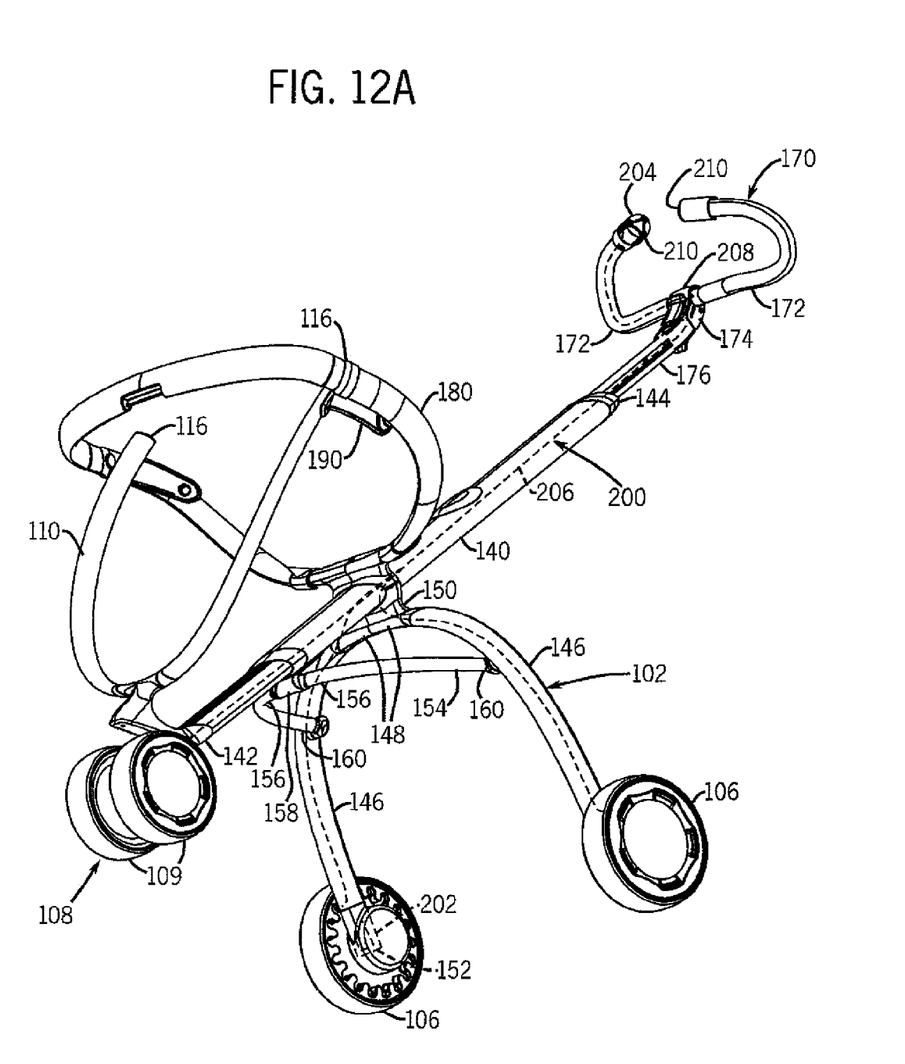
FIG. 12A is a perspective view of a stroller frame similar to that illustrated in FIG. 2, but with the brake system constructed in accordance with an alternative embodiment.
Figure 12B:
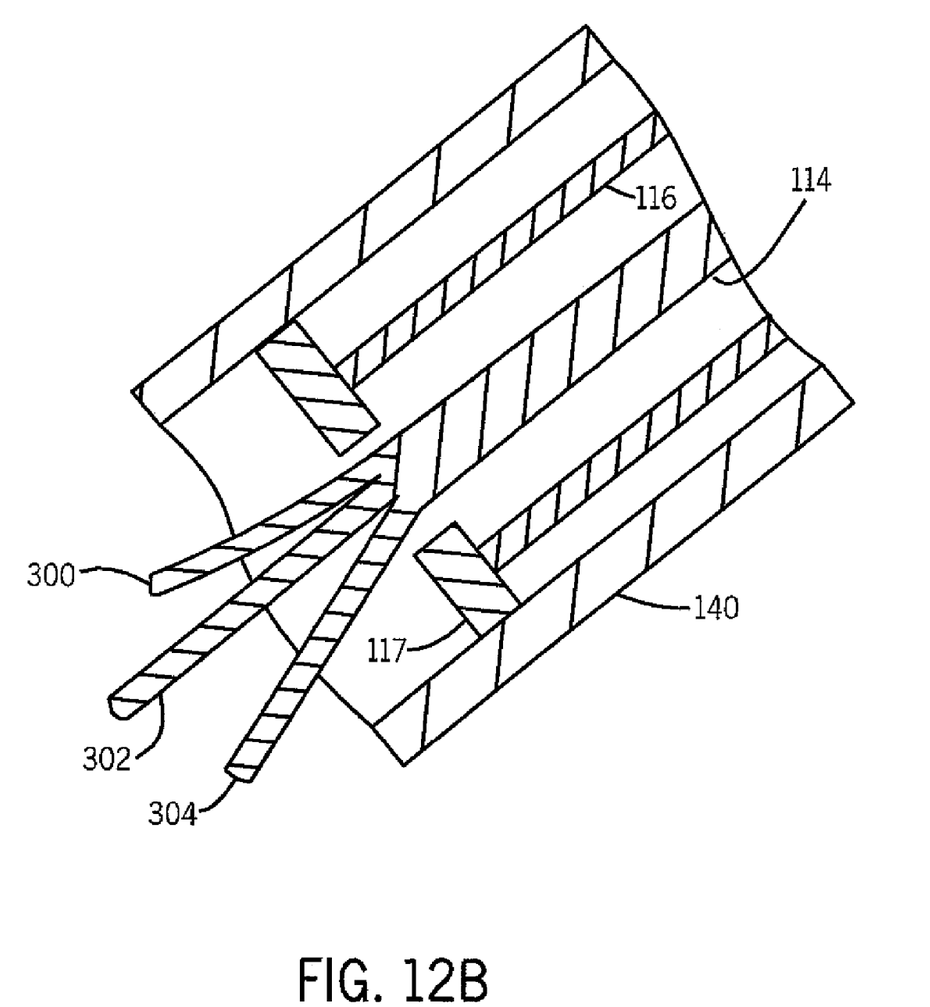
FIG. 12B is a perspective view of a portion of the motion transfer mechanism illustrated in FIG. 12A.

While the brake system 200 has been described in combination with one of the rear wheels 106, the present invention contemplates that the brake system 200 can be associated with either or both rear wheels 106 and the front wheel assembly 108 either alone or in combination. For instance, as illustrated in FIGS. 12A-B, a brake assembly 202 of the type described above is associated with both rear wheels 106 and the front wheel assembly 108. The cable assembly 112 thus extends from the brake operator 204, through the handle section 172 and stanchion 176, and partially into the spine 140 where the sheath 116 is anchored to a plate 117 connected inside the spine 140. An aperture 119 extends through the plate, and the cable 114 extends through the aperture 119 and is connected to a plurality of cable segments 300, 302, and 304 that extend to the brake assemblies 202 disposed at the rear wheels 106 and front wheel assembly 108, respectively. The cable segments 300, 302, and 304 can include a cable surrounded by a cable sheath in a manner understood by one having ordinary skill in the art. The distal ends of the cable segments 300-304 are connected to the corresponding brake assembly 202 in the manner described above.

Accordingly, actuation of the operator 204 causes the cable assembly 112 and all cable segments to actuate the corresponding brake assemblies 202 in the manner described above. It should be appreciated that one or all of the cable segments 300-304 can be provided to operate either or both rear wheels 106 and the front wheel assembly 108 either alone or in combination. As described above, the driving rotation or the angular orientation front wheel assembly 108 can be controlled by either brake assembly 202 or brake assembly 202'. Alternatively still, the brake assembly 202 can be used to prevent adjustment of the angular orientation of the front wheel assembly 108 in the manner described above.

Although certain embodiments have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A stroller comprising:
a stroller frame supported by rotatable wheels;
a brake assembly supported by the frame and operably coupled to one of the rotatable wheels;
a brake operator operably coupled to the brake assembly; and
a handle connected to the stroller frame and having two handle sections each curved inward toward the other and terminating at a free terminal end spaced laterally across the stroller frame from the other,
wherein movement of the brake operator to a brake position causes the brake assembly to retard rotation of the wheel, and wherein the brake operator is rotatably affixed to the free terminal end of one of the handle sections,
wherein the brake operator further comprises
a knob with an outer collar receiving an outer surface of the terminal end of the handle sufficiently loosely such that the outer collar and the outer surface can rotate relative to one another,
an elongate groove on the outer surface,
a channel extending in the terminal end of the handle,
a neck oriented axially between axial ends of the knob, and
an elongate channel extending into the neck and terminating at an aperture, the aperture anchoring the cable at a mouth of the channel,
wherein the cable extends along the elongate channel, the groove, the channel in the terminal end, and to the brake assembly.

2. A stroller according to claim 1, wherein the brake operator is rotatable about an axis of the handle.

3. A stroller according to claim 1, wherein the rotatable wheels include two rear wheels and wherein the two rear wheels are locked from rotating when the brake operator is in the brake position.

4. A stroller according to claim 1, wherein the knob is rotatable and provides tactile feedback to a user when rotated between the brake position and a release position.

5. A stroller according to claim 4, wherein the rotatable knob includes a plurality of circumferentially spaced and axially extending grip surfaces.

6. A stroller according to claim 1, wherein the knob is a rotatable continuation of the handle.

7. A stroller according to claim 1, wherein the one wheel is rotatable about a wheel axle and the brake assembly retards rotation of the one wheel about the wheel axle.

8. A stroller according to claim 1, where the one wheel is rotatable relative to a generally vertical swivel axis and the brake assembly retards rotation of the one wheel about the swivel axis.

9. A stroller comprising:
a stroller frame supported by wheels;
a brake assembly operably coupled to one of the wheels;
a stroller handle extending along an axis; and
a brake operator operably coupled via a cable to the brake assembly and carried on the handle,
wherein the brake operator is rotatable about a rotation axis coaxial with the axis of the handle, wherein rotation of the brake operator to a brake position causes the brake assembly to retard rotation of the one wheel, and wherein the cable is routed through an interior of a frame tube of the handle,
wherein the brake operator further comprises
a knob with an outer collar disposed at a free terminal end of the handle, the outer collar receiving a necked-down outer surface of the terminal end sufficiently loosely such that the outer collar and the outer surface can rotate relative to one another;
an elongate groove on the necked-down outer surface;
an elongate interior, centrally disposed cylindrical wall in the terminal end of the handle;
a channel extending adjacent the cylindrical wall;
a neck oriented axially between axial ends of the knob; and
an elongate curved channel radially extending into a circumferential surface of the neck and terminating at an aperture, the aperture anchoring the cable at a mouth of the channel,
wherein the cable extends along the elongate curved channel, the groove, the channel adjacent the cylindrical wall, and to the brake assembly.

10. A stroller according to claim 9, wherein rotation of the knob toward a release position spools the cable around the neck via the curved channel, thereby drawing a distal end of the cable from the brake assembly.

11. A stroller according to claim 9, wherein rotation of the knob toward the brake position unwinds the cable from the neck via the curved channel, thereby allowing the distal end of the cable to move toward the brake assembly.

12. A stroller according to claim 9, wherein the channel adjacent the cylindrical wall guides the cable along the axis of the handle frame during rotation of the knob.

13. A stroller according to claim 9, wherein rotation of the knob about the axis of the handle results in linear movement of the cable.

14. A stroller according to claim 9, wherein the brake operator includes an anti-rotation mechanism which maintains the brake operator in the brake position or in a release position when selected.

15. A stroller according to claim 9, wherein the one wheel is rotatable about a wheel axle and the brake assembly retards rotation of the one wheel about the wheel axle.

16. A stroller according to claim 9, where the one wheel is rotatable relative to a generally vertical swivel axis and the brake assembly retards rotation of the one wheel about the swivel axis.

17. A stroller comprising:
a stroller frame supported by wheels;
a brake assembly operably coupled to one of the wheels;
a stroller handle; and
a brake operator operably coupled via a cable to the brake assembly and carried on the handle,
wherein the brake operator is rotatable about an axis of the handle, wherein rotation of the brake operator to a brake position causes the brake assembly to retard rotation of the one wheel, and wherein the cable is routed through an interior of a frame tube of the handle, wherein the brake operator further comprises a knob with an outer collar disposed at a free terminal end of the handle, the outer collar receiving an outer surface of the terminal end sufficiently loosely such that the outer collar and the outer surface can rotate relative to one another;

an elongate groove on the outer surface;

a channel extending in the terminal end of the handle;

a neck oriented axially between axial ends of the knob; and an elongate channel extending into the neck and terminating at an aperture, the aperture anchoring the cable at a mouth of the channel, wherein the cable extends along the elongate channel, the groove, the channel in the terminal end, and to the brake assembly.

* * * * *